May 26, 1964 C. M. WEIBULL 3,134,629
SILOS

Filed Nov. 6, 1961 2 Sheets-Sheet 1

Inventor:
Claes Martin Weibull
By
Karl W. Flocks
Attorney

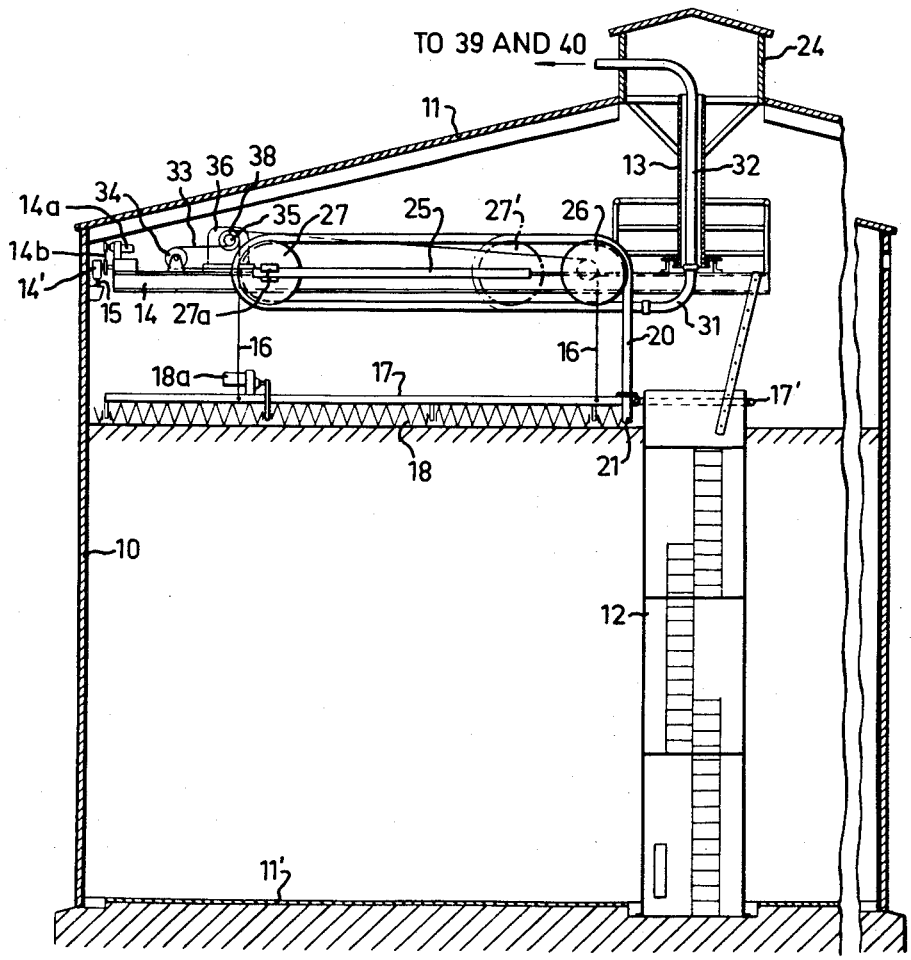

United States Patent Office 3,134,629
Patented May 26, 1964

3,134,629
SILOS
Claes Martin Weibull, Malmö, Sweden, assignor to Ingeniorsfirman Nils Weibull AB, Malmö, Sweden, a corporation of Sweden
Filed No. 6, 1961, Ser. No. 150,535
Claims priority, application Sweden Apr. 11, 1961
4 Claims. (Cl. 302—50)

This invention relates to silos defining a cylindrical storage space for loosely storing fine-grained bulk material. More particularly this invention relates to method and device for emptying a silo of the type referred to above.

According to the invention bulk material is horizontally moved by mechanical means radially away from the periphery of the silo to the neighbourhood of the axis of the silo, and thence said material is vertically moved by means of an air stream in a suction hose.

According to one feature of the invention there is provided in a silo defining a cylindrical storage space for loosely storing fine-grained bulk material a device for emptying the silo, comprising a radially extending mechanical conveyor for feeding material toward the central vertical silo axis, means mounting said conveyor for rotation about and movement vertically along said axis, a suction conduit having one end disposed on the conveyor adjacent the discharge end thereof and extending out of the silo storage space at the top of said space centrally thereof, exhaust means connected to the other end of said suction conduit, means in said conduit for separating material entrained in air drawn through said suction conduit by said exhausting means, a flexible hose forming at least part of said suction conduit, tackle means forming at least one loop, variable in length, of said hose and allowing said one end to move along said axis together with said conveyor, and means in said suction conduit permiting said one end to move about said axis together with said conveyor.

The invention has been developed particularly for starch storage silos and will be described more fully in the following with reference to the accompanying drawings illustrating two embodiments, chosen by way of example, of silos for this particular purpose. In the drawings:

FIG. 2 is a corresponding view of a silo having the tackle means located inside the storage space of the silo;

Figure 1:
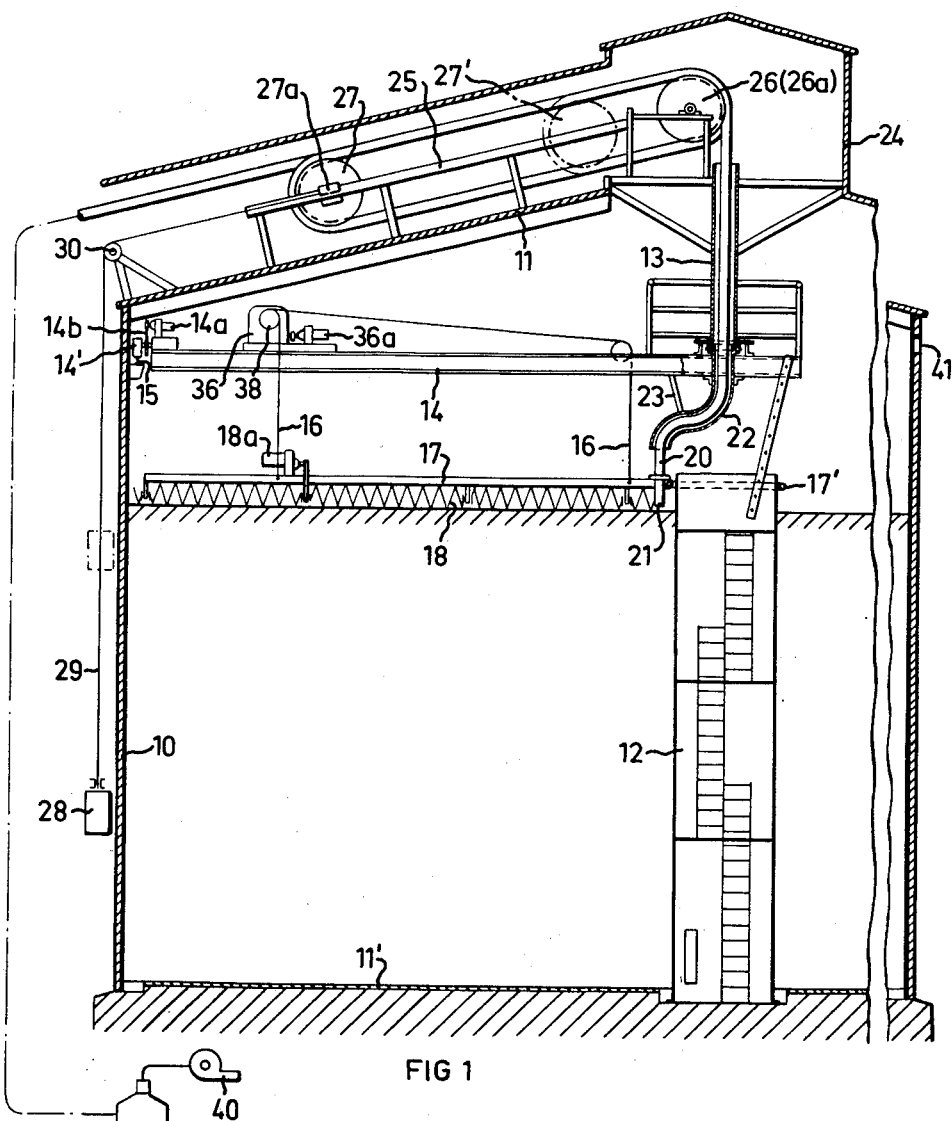
FIG. 1 is a fragmentary vertical sectional view of a silo having the tackle means located outside the storage space of the silo.
Figure 3:
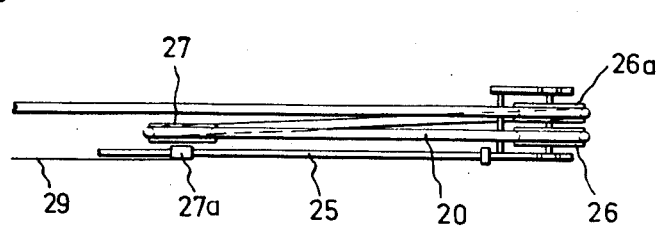
FIG. 3 is a plan view of the tackle means and the flexible hose associated therewith as shown in FIG. 1.

In the silos shown in FIGS. 1 and 2 there is provided a storage space defined by a cylindrical side wall 10, a roof 11 and a floor 11'. A stationary self-supporting hollow column 12 is disposed centrally in the silo in the storage space thereof. A cylindrical pipe 13 is secured in the roof coaxially with column 12 and extends downward into the storage space toward said column, the lower end of the pipe and the upper end of said column being spaced a considerable distance apart. Pipe 13 serves the purpose of pivotally carrying one end of a beam 14 which extends radially between the pipe and the side wall 10 and has its other end supported by wheels 14' on a circular rail 15 on said wall. Means such as a motor 14a and a drive 14b are provided for driving wheels 14' to rotate beam 14 about the central vertical axis of the silo. Suspended in wire ropes 16 from beam 14 is a radial frame 17 which can be raised and lowered by winding and unwinding, respectively, the wire ropes on a drum 38 associated with a winch 36 supported by beam 14 and having a drive motor 36a. The frame embraces the column 12 with a U-shaped member 17' and bears by rollers against said column. When the beam 14 is driven about the central axis of the silo frame 17 is freely rotatable around the column. Disposed at the underside of the radially projecting part of frame 17 is a feed screw 18 having a motor 18a geared to said screw to drive it in such a direction that it will move the material toward the central axis of the silo. A flexible suction hose 20, preferably a rubber hose reinforced with a coiled wire, has one end rotatably and air-tightly connected to a suction nozzle 21 which in turn is non-rotatably secured in frame 17 adjacent the discharge end of feed screw 18 and has its mouth directed downward in parallel with the axis of the silo in immediate proximity to the outer surface of column 12.

In the embodiment illustrated in FIG. 1, suction hose 20 extends from suction nozzle 21 in an upward direction into the space between pipe 13 and column 12 and through said space to a crank-shaped pipe 22 rotatably mounted in the lower end of pipe 13. Pipe 22 forms a guide for the introduction of the suction hose into pipe 13. Pipe 22 is freely rotatable relative to pipe 13 and is connected by means of a brace 23 to beam 14 to be positively carried along in the rotation thereof. Guided by pipe 13 suction hose 20 extends through said pipe out of the storage space and passes from the upper end of pipe 13 into a superstructure 24 on the silo roof 11. Contained in said superstructure is a tackle means supported by roof 11 and having a frame 25. Rotatably mounted on the latter is a grooved pulley 26 disposed to receive the suction hose from pipe 13 substantially tangentially. From said pulley the hose extends to another grooved pulley 27 rotatably mounted on a carriage 27a which is slidably mounted on frame 25 so as to be displaceable so that pulley 27 can be moved toward and away from pulley 26 in a rectilinear path. From pulley 27 the suction hose, after being bent through 180° over said pulley, extends to a third grooved pulley 26a placed coaxially with pulley 26. This third pulley may be either rotatably mounted or stationary. From pulley 26a suction hose, after being bent through 180° over said pulley, extends out of the superstructure 24 to a cyclone apparatus 39 in a discharging or weighing-out station, said apparatus being connected to an exhaust air pump 40. The suction hose thus forms a loop between the pulleys and in order that said loop may always be kept stretched, carriage 27a is biased away from pulleys 26 and 26a by a weight 28 which hangs down along side wall 10 in a rope 29 which extends from carriage 27a to the edge of roof 11 and over a pulley 30 downward along side wall 10.

For emptying the silo the screw conveyor including frame 17 and feed screw 18 is lowered from beam 14 into contact with the surface of bulk material stored in the silo. The bulk material is successively scraped radially inwardly by the rotating feed screw 18 to the area adjacent the outer surface of column 12. Suction is effected in suction hose 20 by exhaust air pump 40 so that the bulk material is sucked from said area through the suction nozzle 21 and the suction hose 20 to be separated in the cyclone apparatus 39; it is of course presupposed that the storage space is not hermetically closed but provided with suitable air inlets as at 41. Such inlets may be provided with suitable filters and air conditioning means. By the beam 14 being driven on rail 15 during rotation about the axis of the silo, the screw conveyor is also moved around the column so that feed screw 18 scrapes off layer by layer from the surface of the bulk material stored, forwarding said scraped-off material to the suction nozzle 21 to be carried away through suction hose 20. Suction nozzle 21 takes part in the movement of the screw conveyor 17, 18 around column 12, and thereby the portion of the suction hose 20 between suction nozzle 21 and rotatable pipe 22 which serves as a guide for the hose, turns in the manner of a crank about the axis of the silo without being twisted, however, since the hose during this turning movement continuously rotates relative to suction nozzle 21 to which the suction hose is rotatably attached. As the level of the bulk material in the storage space sinks due to layer by layer being scraped off, screw conveyor 17, 18 is successively lowered from beam 14. The suction hose is thereby drawn down through pipes 13 and 22 while the suction hose loop formed between pulleys 26 and 27 is shortened, pulley 27 being drawn toward pulley 26 against the load of weight 28 in order finally to take the position 27' shown when screw conveyor 17, 18 is in its lowermost position. When the screw conveyor is again raised the suction hose is drawn up by weight 28 with a straightening of the loop between pulleys 26 and 27 to the position shown in the drawing.

In the embodiment shown in FIG. 2 the tackle means is carried by beam 14. Same as in the embodiment shown in FIG. 1 said means comprises a frame 25, a rotatably mounted grooved pulley 26 carried by said frame and placed to receive suction hose 20 substantially tangentially, and another rotatably mounted grooved pulley 27 to which the suction hose passes from pulley 26 and which is rotatably mounted on a carriage 27a slidably mounted on frame 25 so as to be displaceable so that pulley 27 can be moved toward and away from pulley 26 in a rectilinear path. From pulley 27 the suction hose 20, after being bent through 180° over said pulley, extends to a pipe bow 31 to which it is fixedly connected in an air-tight manner. Pipe bow 31 is rotatably connected to a fixed pipe 32 which extends through pipe 13 and is connected to a cyclone apparatus and an exhaust air pump in the same manner as indicated in FIG. 1 but not shown in FIG. 2. In this case, suction hose 20 is fixedly connected to suction nozzle 21. In order that the loop formed by suction hose 20 between pulleys 26 and 27 may always be kept stretched like in the embodiment according to FIG. 1, carriage 27a is biased in a direction away from pulley 26 by the tension of a wire rope 33 which is passed half a turn about a return pulley 34 on beam 14 and is then secured to a drum 35 to permit winding thereonto. Said drum 35 is associated with winch 36 on beam 14. Wire ropes 16 and 33 as well as the associated drums 35 and 38 are so arranged that the suction hose will be kept stretched to the same degree in different height positions of the screw conveyor and the associated suction nozzle 21. For instance, if the drums are adapted to rotate at the same speed the diameter of drum 35 is half that of drum 38 because the condition for an equal stretching of the suction hose is that the free length-variation of wire rope 33 is half that of wire ropes 16.

It will be obvious to those skilled in the art that various changes may be resorted to without departing from the spirit of the invention, and therefore the invention is not limited to the particular embodiments shown and described in the specification, but only as indicated in the appended claims.

What I claim and desire to secure by Letters Patent is:

1. In a silo defining a cylindrical storage space for loosely storing fine-grained bulk material a device for emptying the silo, comprising a radially extending beam at the top of said storage space, said beam being rotatable about the central vertical silo axis, a radially extending mechanical conveyor, means suspending said conveyor from said beam for movement vertically along said axis relative to said beam and for rotation about said axis together with said beam, said conveyor being arranged for feeding material toward said axis, a suction conduit, a flexible hose forming part of said suction conduit, one end of said suction conduit being fixedly secured to said conveyor adjacent the discharge end thereof to be movable therewith, tackle means mounted on said beam and forming at least one loop, variable in length, of said hose and allowing said one end to move along said axis together with said conveyor relative to said beam, a pipe disposed centrally of said silo and extending substantially vertically into said storage space from the top thereof, a pipe bow at the lower end of said pipe, said pipe and said pipe bow forming part of said suction conduit, means mounting said pipe bow on said pipe for rotational movement together with said beam about the central vertical silo axis exhaust means connected to the other end of said suction conduit outwardly of the storage space, and separating means in said suction conduit for separating material entrained in air drawn through said suction conduit by said exhaust means.

2. In a silo having top, bottom and side walls defining a cylindrical storage space for loosely storing fine-grained bulk material a device for emptying the silo, comprising a radially extending beam near the top of said storage space, means mounting said beam for rotation about the central vertical silo axis, a radially extending mechanical conveyor for scraping material at the upper surface of a mass of bulk material stored in said storage space, toward said axis, means suspending said conveyor from said beam for movement vertically along said axis relative to said beam and for rotation about said axis together with said beam, a central column in said storage space extending vertically from said bottom wall and having its upper end spaced from said top wall, means on said conveyor embracing said column to guide said conveyor for movement along and about said axis, a suction conduit, a flexible hose forming part of said suction conduit, one end of said suction conduit being fixedly secured to said conveyor adjacent the discharge end thereof to be movable therewith, tackle means mounted on said beam and forming at least one loop, variable in length, of said hose and allowing said one end to move along said axis together with said conveyor relative to said beam, a pipe disposed centrally of said silo and extending substantially vertically into said storage space from the top wall thereof, said pipe having its lower end spaced from the upper end of said column, a pipe bow at the lower end of said pipe, said pipe and said bow forming part of said suction conduit, means mounting said pipe bow on said pipe for rotational movement together with said beam about the central vertical silo axis, exhaust means connected to the storage space and suction conduit outwardly of the storage space and separating means in said suction conduit for separating material entrained in air drawn through said suction conduit by said exhaust means.

3. In a silo defining a cylindrical storage space for loosely storing fine-grained bulk material a device for emptying the silo, comprising a radially extending beam at the top of said storage space, said beam being rotatable about the central vertical silo axis, a radially extending mechanical conveyor, means suspending said conveyor from said beam for movement vertically along said axis relative to said beam and for rotation about said axis together with said beam, said conveyor being arranged for feeding material toward said axis, a suction conduit having one end fixedly secured to said conveyor adjacent the discharge end thereof to be movable therewith, means on said beam forming a part of said suction conduit variable in length thereby allowing said one end to move along said axis together with said conveyor relative to said beam, a pipe extending centrally of said silo into said storage space from the top thereof and forming part of said suction conduit, means allowing at least part of the pipe to be rotated with said beam about the central vertical silo axis, exhaust means connected to the other end of said suction conduit outwardly of the storage space, and separating means in said suction conduit for separating material entrained in air drawn through said suction conduit by said exhaust means.

4. In a silo having top, bottom and side walls defining a cylindrical storage space for loosely storing fine-grained bulk material a device for emptying the silo, comprising a radially extending beam near the top of said storage space, means mounting said beam for rotation about the central vertical silo axis, a radially extending mechanical conveyor for scraping material at the upper surface of a mass of bulk material stored in said storage space, toward said axis, means suspending said conveyor from said beam for movement vertically along said axis relative to said beam and for rotation about said axis together with said beam, a central column in said storage space extending vertically from said bottom wall and having its upper end spaced from said top wall, means on said conveyor embracing said column to guide said conveyor for movement along and about said axis, a suction conduit having one end fixedly secured to said conveyor adjacent the discharge end thereof to be movable therewith, means on said beam, forming a part of said suction conduit variable in length thereby allowing said one end to move along said axis together with said conveyor relative to said beam, a pipe extending centrally of said silo into said storage space from the top wall thereof and forming part of said suction conduit, means allowing at least part of the pipe to be rotated with said beam about the central vertical silo axis, exhaust means connected to the other end of said suction conduit outwardly of the storage space, and separating means in said suction conduit for separating material entrained in air drawn through said suction conduit by said exhaust means.

References Cited in the file of this patent
UNITED STATES PATENTS

| | | |
|---|---|---|
| 1,479,990 | Keys | Jan. 8, 1924 |
| 2,168,951 | Caldwell | Aug. 8, 1939 |
| 2,225,859 | Cox | Dec. 24, 1940 |
| 2,500,043 | Radtke | Mar. 7, 1950 |
| 2,663,594 | Dennick | Dec. 22, 1953 |
| 2,963,327 | Seymour | Dec. 6, 1960 |